(12) United States Patent
Parekh

(10) Patent No.: US 11,763,295 B2
(45) Date of Patent: Sep. 19, 2023

(54) METHOD OF MONITORING TRANSACTION ACTIVITY OF PAYMENT CARDS ASSOCIATED WITH DIGITAL WALLETS

(71) Applicant: MASTERCARD INTERNATIONAL INCORPORATED, Purchase, NY (US)

(72) Inventor: Pravin Parekh, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 1475 days.

(21) Appl. No.: 15/292,733

(22) Filed: Oct. 13, 2016

(65) Prior Publication Data

US 2017/0109731 A1 Apr. 20, 2017

(30) Foreign Application Priority Data

Oct. 14, 2015 (SG) .............................. 10201508517S

(51) Int. Cl.
*G06Q 20/00* (2012.01)
*G06Q 20/36* (2012.01)

(52) U.S. Cl.
CPC .................................. *G06Q 20/367* (2013.01)

(58) Field of Classification Search
CPC ............... G06Q 20/36; G06Q 20/3674; G06Q 20/3672; G06Q 20/40; G06Q 20/367
See application file for complete search history.

(56) References Cited

U.S. PATENT DOCUMENTS

2003/0028481 A1* 2/2003 Flitcroft .................. G06Q 20/00
705/39

2015/0081462 A1* 3/2015 Ozvat ..................... G06Q 20/40
705/21
2019/0295054 A1* 9/2019 Purves .................. G06Q 20/227

FOREIGN PATENT DOCUMENTS

WO WO-2014022383 A1 * 2/2014 ............... G06K 5/00
WO WO-2015073263 A1 * 5/2015 ........... G06Q 20/382

OTHER PUBLICATIONS

The Fundamentals of mobile and digital payments for Bankers-Source: ABA Banking Journal Date: Jul. 1, 2015.*
Apple Pay Vs Walmart's CurrentC: What Shoppers Need To Know. O'Connor, Clare coconnor@forbes.com Forbes.com. Oct. 31, 2014, p. 2-2. 1p (Year: 2014).*

* cited by examiner

*Primary Examiner* — Richard C Weisberger
(74) *Attorney, Agent, or Firm* — Grant Attorneys At Law PLLC

(57) ABSTRACT

A method for selecting consumers for targeted messages is described, the method comprising the steps of generating a token for representing a payment card number, and storing in a token table, an association of a wallet service provider ID, a digital wallet ID, the payment card number and the token. The method further comprises the steps of analyzing transaction data in a transaction table, the transaction data comprising transactions, and determining that the token is inactive when at least one of a set of predetermined conditions is satisfied. The method further comprises the steps of identifying the digital wallet ID and the wallet service provider ID that is associated with the inactive token and providing the identified digital wallet ID to a digital wallet service provider server having the identified wallet service provider ID, the identified digital wallet ID associated with the consumer to be selected for targeted messages.

10 Claims, 8 Drawing Sheets

| Token | Transactions | Date transaction occurred | Value |
|---|---|---|---|
| Token 1 | Transaction 1 | 25-01-2015 | Value 1 |
| Token 1 | Transaction 2 | 01-07-2015 | Value 2 |
| Token 2 | Transaction 3 | 04-07-2015 | Value 3 |
| Token 2 | Transaction 4 | 12-07-2015 | Value 4 |
| Token 2 | Transaction 5 | 30-07-2015 | Value 5 |
| Token 2 | Transaction 6 | 08-08-2015 | Value 6 |
| Token 3 | Transaction 7 | 21-07-2015 | $200 |
| Token 3 | Transaction 8 | 15-08-2015 | $30 |
| Token 3 | Transaction 9 | 27-08-2015 | $50 |
| Token 4 | Transaction 10 | DD-MM-YYYY | Value 10 |
| Token 5 | Transaction 11 | DD-MM-YYYY | Value 11 |
| Token 5 | Transaction 12 | DD-MM-YYYY | Value 12 |
| Token 6 | Transaction 13 | DD-MM-YYYY | Value 13 |
| Token 7 | Transaction 14 | DD-MM-YYYY | Value 14 |
| Token 310 | Transaction 15 | 20-01-2015 | Value 15 |
| Token 311 | Transaction 16 | 01-07-2015 | Value 16 |

| Token | Payment card number | Digital wallet ID | Wallet service provider ID |
|---|---|---|---|
| Token 1 | 1111-1111-1111-1111 | Wallet 1 | Wallet service provider 1 |
| Token 2 | 2222-1111-1111-1111 | Wallet 1 | Wallet service provider 1 |
| Token 3 | 3333-1111-1111-1111 | Wallet 2 | Wallet service provider 2 |
| Token 4 | 4444-1111-1111-1111 | Wallet 3 | Wallet service provider 3 |
| Token 5 | 5555-1111-1111-1111 | Wallet 3 | Wallet service provider 3 |
| Token 6 | 6666-1111-1111-1111 | Wallet 3 | Wallet service provider 3 |
| Token 7 | 7777-1111-1111-1111 | Wallet 4 | Wallet service provider 1 |
| Token 8 | 8888-1111-1111-1111 | Wallet 5 | Wallet service provider 3 |
| Token 310 | Payment card number 503 | Digital wallet ID 505 | Wallet service provider ID 506 |
| Token 311 | Payment card number 503 | Digital wallet ID 508 | Wallet service provider ID 509 |

Figure 3

| Token | Transactions | Date transaction occurred | Value |
|---|---|---|---|
| Token 1 | Transaction 1 | 25-01-2015 | Value 1 |
| Token 1 | Transaction 2 | 01-07-2015 | Value 2 |
| Token 2 | Transaction 3 | 04-07-2015 | Value 3 |
| Token 2 | Transaction 4 | 12-07-2015 | Value 4 |
| Token 2 | Transaction 5 | 30-07-2015 | Value 5 |
| Token 2 | Transaction 6 | 08-08-2015 | Value 6 |
| Token 3 | Transaction 7 | 21-07-2015 | $200 |
| Token 3 | Transaction 8 | 15-08-2015 | $30 |
| Token 3 | Transaction 9 | 27-08-2015 | $50 |
| Token 4 | Transaction 10 | DD-MM-YYYY | Value 10 |
| Token 5 | Transaction 11 | DD-MM-YYYY | Value 11 |
| Token 5 | Transaction 12 | DD-MM-YYYY | Value 12 |
| Token 6 | Transaction 13 | DD-MM-YYYY | Value 13 |
| Token 7 | Transaction 14 | DD-MM-YYYY | Value 14 |
| Token 310 | Transaction 15 | 20-01-2015 | Value 15 |
| Token 311 | Transaction 16 | 01-07-2015 | Value 16 |

Figure 4

METHOD OF MONITORING TRANSACTION ACTIVITY OF PAYMENT CARDS ASSOCIATED WITH DIGITAL WALLETS

FIELD OF THE INVENTION

The following discloses a method and system for selecting consumers for targeted messages.

BACKGROUND

Digital wallet service providers (for example Apple®, Samsung® and Google®) do not collect or store any transactional information. In fact, digital wallet service providers do not even have access to the payment card numbers of the payment cards which have been added to the digital wallet. Digital wallet service providers would typically not want to manage or store the transaction data as it is a potential data security risk.

As the digital wallet service providers are not privy to the transaction information of the digital wallets, digital wallet service providers would not be able to tell which digital wallets are being actively used, and which digital wallets are not actively used. Therefore digital wallet service providers would not be able to sieve out the inactive consumers, and send targeted promotions to these inactive consumers.

Therefore, there is a need for a method and system for selecting consumers for targeted messages. More particularly, there is a need for a method and system for identifying consumers who are inactive, and selecting these inactive consumers for targeted messages.

Furthermore, other desirable features and characteristics will become apparent from the subsequent detailed description and the appended claims, taken in conjunction with the accompanying drawings and this background of the disclosure.

SUMMARY OF INVENTION

According to a first aspect of the invention, a method for selecting consumers for targeted messages is described, the method comprising the steps of generating at a platform, a token for representing a payment card number of a payment card, after the payment card has been added to a digital wallet, the digital wallet having a digital wallet ID; storing in a token table at the platform, an association of a wallet service provider ID, the digital wallet ID, the payment card number and the token; and analyzing at the platform, transaction data in a transaction table, the transaction data comprising transactions, and determining that the token is inactive when at least one of a set of predetermined conditions is satisfied. The method further comprises the steps of identifying at the platform, the digital wallet ID and the wallet service provider ID that is associated with the inactive token in the token table; and providing from the platform the identified digital wallet ID to a digital wallet service provider server having the identified wallet service provider ID, the identified digital wallet ID associated with the consumer to be selected for targeted messages.

Preferably, the set of predetermined conditions includes the predetermined condition that the transaction data does not comprise any transactions involving the token.

Preferably, the set of predetermined conditions includes the predetermined condition that the transaction data comprises at least one transaction involving the token, and out of the at least one transaction involving the token, there is a latest transaction having a date, and the time elapsed since the date of the latest transaction exceeds a predetermined period.

Preferably, the set of predetermined conditions includes the predetermined condition that the transaction data comprises a plurality of transactions involving the token, the plurality of transactions involving the token comprising a first group of transactions which occurred in a first period and a second group of transactions which occurred in a second period, the second period being later than the first period, and the number of transactions in the second group is less than the number of transactions in the first group by a predetermined margin.

Preferably, the set of predetermined conditions includes the predetermined condition that the transaction data comprises another plurality of transactions involving the token, each of the another plurality of transactions involving the token having a value, the another plurality of transactions involving the token comprising a third group of transactions which occurred in a third period and a fourth group of transactions which occurred in a fourth period, the fourth period being later than the third period, and the combined value of the transactions in the fourth group is less than the combined value of the transactions in the third group by a predetermined threshold.

Preferably, the method further comprises the step of sending targeted messages to the consumer associated with the identified digital wallet ID.

Preferably, the method further comprises the step of assigning a consumer category to the identified digital wallet ID based on which of the at least one of the set of predetermined conditions is satisfied.

Preferably, the method further comprises the step of providing from the platform to the digital wallet service provider server the assigned consumer category and a description of the assigned consumer category with the identified digital wallet ID.

Preferably, the method further comprises the step of sending targeted messages to the consumer associated with the identified digital wallet ID further comprises the step of sending targeted messages based upon the assigned consumer category and the description of the assigned consumer category.

Preferably, the method further comprises the steps of generating at the platform, another token for representing the payment card number of the payment card, after the payment card has been added to another digital wallet, the another digital wallet having another digital wallet ID; storing in the token table at the platform, an association of another wallet service provider ID, the another digital wallet ID, the payment card number and the another token; analyzing at the platform transaction data in the transaction table, and determining that the another token is inactive when the at least one of a set of predetermined conditions is satisfied; identifying at the platform, the another digital wallet ID and the another wallet service provider ID that is associated with the another inactive token in the token table; determining at the platform, that the another inactive token is more inactive than the inactive token; and providing from the platform the another identified digital wallet ID to another digital wallet service provider server having the another identified wallet service provider ID, the another identified digital wallet ID associated with the consumer to be selected for targeted messages.

Preferably, the method further comprises the step of assigning another consumer category to the another identified digital wallet ID.

Preferably, the method further comprises the step of sending targeted messages to the consumer associated with the another identified digital wallet ID.

Preferably, the method further comprises the step of providing from the platform to the another digital wallet service provider server the another assigned consumer category and a description of the another assigned consumer category with the another identified digital wallet ID.

Preferably, the method further comprises the step of sending targeted messages to the consumer associated with the another identified digital wallet ID further comprises the step of sending targeted messages based upon the another assigned consumer category and the description of the another assigned consumer category.

Preferably, the digital wallet and the another digital wallet are installed on different consumer devices.

Preferably, the targeted messages contain any one of the following: offers, promotions, warnings and step by step instructions on using the digital wallet.

According to a second aspect of the invention, a system for selecting consumers for targeted messages is described, the system comprising a platform having a database and at least one processor, the database for storing a token table and a transaction table, and the at least one processor configured to generate a token for representing a payment card number of a payment card, after the payment card has been added to a digital wallet, the digital wallet having a digital wallet ID; store in the token table, an association of a wallet service provider ID, the digital wallet ID, the payment card number and the token; and analyze transaction data in a transaction table, the transaction data comprising transactions, and determine that the token is inactive when at least one of a set of predetermined conditions is satisfied. The at least one processor is further configured to identify the digital wallet ID and the wallet service provider ID that is associated with the inactive token in the token table and provide the identified digital wallet ID to a digital wallet service provider server having the identified wallet service provider ID, the identified digital wallet ID associated with the consumer to be selected for targeted messages.

Preferably, the set of predetermined conditions includes the predetermined condition that the transaction data does not comprise any transactions involving the token.

Preferably, the set of predetermined conditions includes the predetermined condition that the transaction data comprises at least one transaction involving the token, and out of the at least one transaction involving the token, there is a latest transaction having a date, and the time elapsed since the date of the latest transaction exceeds a predetermined period.

Preferably, the set of predetermined conditions includes the predetermined condition that the transaction data comprises a plurality of transactions involving the token, the plurality of transactions involving the token comprising a first group of transactions which occurred in a first period and a second group of transactions which occurred in a second period, the second period being later than the first period, and the number of transactions in the second group is less than the number of transactions in the first group by a predetermined margin.

Preferably, the set of predetermined conditions includes the predetermined condition that the transaction data comprises another plurality of transactions involving the token, each of the another plurality of transactions involving the token having a value, the another plurality of transactions involving the token comprising a third group of transactions which occurred in a third period and a fourth group of transactions which occurred in a fourth period, the fourth period being later than the third period, and the combined value of the transactions in the fourth group is less than the combined value of the transactions in the third group by a predetermined threshold.

Preferably, the at least one processor is further configured to send targeted messages to the consumer associated with the identified digital wallet ID.

Preferably, the at least one processor is further configured to assign a consumer category to the identified digital wallet ID based on which of the at least one of the set of predetermined conditions is satisfied.

Preferably, the at least one processor is further configured to provide from the platform to the digital wallet service provider server the assigned consumer category and a description of the assigned consumer category with the identified digital wallet ID.

Preferably, the at least one processor is further configured to send targeted messages to the consumer associated with the identified digital wallet ID based upon the assigned consumer category and the description of the assigned consumer category.

Preferably, the at least one processor is further configured to generate another token for representing the payment card number of the payment card, after the payment card has been added to another digital wallet, the another digital wallet having another digital wallet ID; store in the token table, an association of another wallet service provider ID, the another digital wallet ID, the payment card number and the another token; analyze transaction data in the transaction table, and determine that the another token is inactive when the at least one of a set of predetermined conditions is satisfied; identify the another digital wallet ID and the another wallet service provider ID that is associated with the another inactive token in the token table; determine that the another inactive token is more inactive than the inactive token; and provide the another identified digital wallet ID to another digital wallet service provider server having the another identified wallet service provider ID, the another identified digital wallet ID associated with the consumer to be selected for targeted messages.

Preferably, the at least one processor is further configured to send targeted messages to the consumer associated with the another identified digital wallet ID.

Preferably, the at least one processor is further configured to assign another consumer category to the another identified digital wallet ID.

Preferably, the at least one processor is further configured to provide to the another digital wallet service provider server the another assigned consumer category and a description of the another assigned consumer category with the another identified digital wallet ID.

Preferably, the at least one processor is further configured to send targeted messages to the consumer associated with the another identified digital wallet ID based upon the another assigned consumer category and the description of the another assigned consumer category.

Preferably, the digital wallet and the another digital wallet are installed on different consumer devices.

Preferably, the targeted messages contain any one of the following: offers, promotions, warnings and step by step instructions on using the digital wallet.

According to a third aspect of the invention, a computer program product for selecting consumers for targeted messages is described, the computer program product having a computer readable storage medium having computer readable program code configured to generate a token for representing a payment card number of a payment card, after the payment card has been added to a digital wallet, the digital wallet having a digital wallet ID; store in a token table, an association of a wallet service provider ID, the digital wallet ID, the payment card number and the token; analyze transaction data in a transaction table, the transaction data comprising transactions, and determine that the token is inactive when at least one of a set of predetermined conditions is satisfied; identify the digital wallet ID and the wallet service provider ID that is associated with the inactive token in the token table; and provide the identified digital wallet ID to a digital wallet service provider server having the identified wallet service provider ID, the identified digital wallet ID associated with the consumer to be selected for targeted messages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

FIG. 3 shows an exemplary token table.

FIG. 4 shows an exemplary transaction table.

Figure 1:
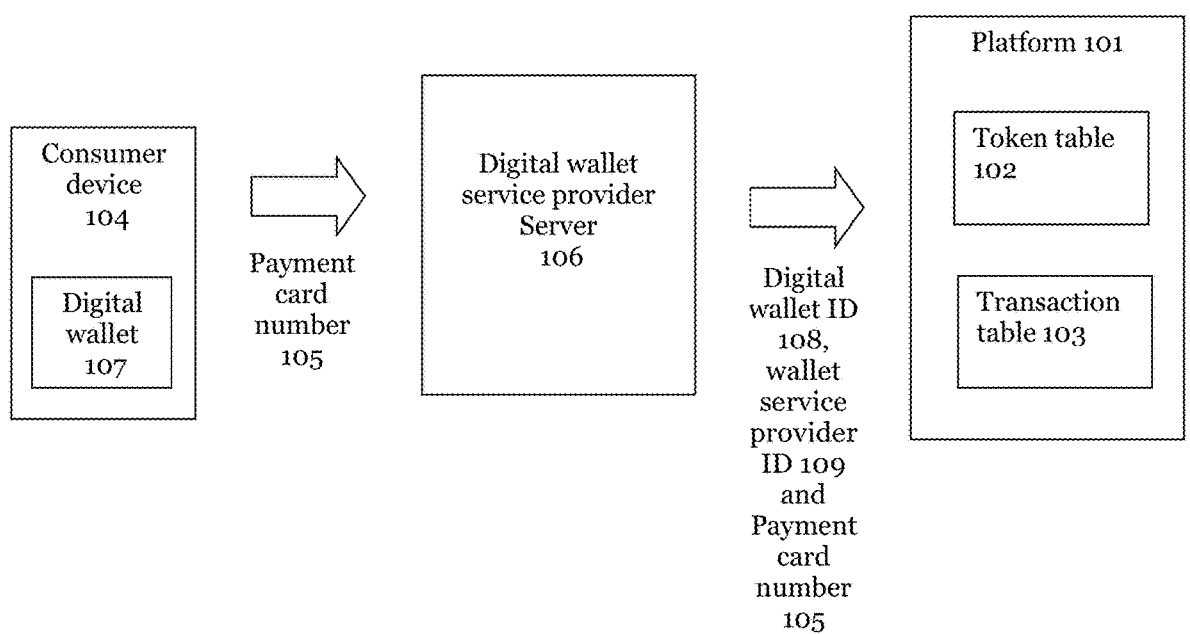
FIG. 1 shows a system for selecting consumers for targeted messages in accordance with an embodiment of the invention.

Skilled artisans will appreciate that elements in the figures are illustrated for simplicity and clarity and have not necessarily been depicted to scale. For example, the dimensions of some of the elements in the block diagrams or steps in the flowcharts may be exaggerated in respect to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the preferred embodiments to disclose a method and system for selecting consumers for targeted messages.

The invention achieves the above objectives by disclosing a platform that generates a token for representing a payment card number of a payment card after the digitization of the payment card. The digitization involves the payment card being added to a digital wallet, the digital wallet belonging to a consumer. The digital wallet service provider supplies the digital wallet ID to the platform as part of the token generation process. The digital wallet service provider also supplies the wallet service provider ID to the platform. The platform stores the digital wallet ID, the payment card number and the token in a token table. The platform references a transaction table. The transaction table comprises transaction data, and the transaction data comprises transactions.

The platform analyzes the transaction data, and determines that the token is inactive when at least one of a set of predetermined conditions is satisfied. The set of predetermined conditions includes the predetermined condition that (1) the transaction data does not comprise any transactions involving the token, (2) the transaction data comprises at least one transaction involving the token, and out of the at least one transaction involving the token, there is a latest transaction having a date, and the time elapsed since the date of the latest transaction exceeds a predetermined period, (3) the transaction data comprises a plurality of transactions involving the token, the plurality of transactions involving the token comprising a first group of transactions which occurred in a first period and a second group of transactions which occurred in a second period, the second period being later than the first period, and the number of transactions in the second group is less than the number of transactions in the first group by a predetermined margin, and (4) the predetermined condition that the transaction data comprises a plurality of transactions involving the token, each of the plurality of transactions involving the token having a value, the plurality of transactions involving the token comprising a first group of transactions which occurred in a first period and a second group of transactions which occurred in a second period, the second period being later than the first period, and the combined value of the transactions in the second group is less than the combined value of the transactions in the first group by a predetermined margin.

The platform then references the token table and identifies the digital wallet ID that is associated with the inactive token. The platform then provides the identified digital wallet ID to the digital wallet service provider, who will in turn send the consumer associated with the identified digital wallet ID targeted messages. The targeted messages can contain offers or promotions to encourage consumers to use their digital wallet. The targeted messages can also contain warnings to warn consumers that if they do not increase the usage of their digital wallet, their digital wallet will be deactivated. The targeted messages can also contain step by step instructions to guide consumers on how to use their digital wallet. The invention therefore advantageously identifies the select group of people who are inactive in the use of their digital wallets. The dataset can also be monetized when it is shared or sold to digital wallet service providers. The digital wallet service providers can then send these inactive consumers targeted messages containing promotions and offers. Alternatively, the platform can send targeted messages containing promotions and offers directly to the inactive consumers.

There can be scenarios where a consumer has added the same payment card to a first digital wallet (for example Apple Pay®) managed by one digital wallet service provider (for example Apple®), and a second digital wallet (for example Google Wallet®) managed by another digital wallet service provider (for example Google®). The platform will therefore generate a token for the first digital wallet and generate another token for the second digital wallet. The first digital wallet can be installed on a first consumer device while the second digital wallet can be installed on a second consumer device. In this embodiment of the invention, the platform is not only capable of determining whether or not the two tokens are inactive, but also capable of determining which of the two tokens is more inactive. This determination is useful to a digital wallet service provider as this can serve as an indication that the consumer has "switched" digital wallets and is more actively making purchases with a digital wallet from another digital wallet service provider. The digital wallet service provider can therefore take remedial steps to convince the consumer to start actively using its digital wallet again by providing more incentives through targeted messages containing offers and promotions.

In an embodiment of the invention, the platform assigns a consumer category to the identified digital wallet ID based on which of the at least one of the set of predetermined conditions is satisfied. In advantageously classifying or categorizing how "inactive" a consumer is, this information would be very useful to digital wallet service providers in tailoring their promotions. The targeted messages containing promotions and offers are then sent to the consumer based upon the consumer category assigned to the identified digital wallet ID.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

FIG. 1 shows a system for selecting consumers for targeted messages in accordance with an embodiment of the invention. The system comprises platform 101. Preferably, platform 101 comprises token table 102 and transaction table 103. Preferably, token table 102 and transaction table 103 are stored in a database in platform 101. Alternatively, token table 102 and transaction table 103 are stored in a remote database accessible by platform 101. Preferably, platform 101 may be maintained or managed by a payment processing company, for example, MasterCard®.

When a consumer wishes to add a payment card (for example, credit card or debit card) to digital wallet 107 on consumer device 104, a concept known as "provisioning", the consumer will use consumer device 104 to send payment card number 105 of his payment card to digital wallet service provider server 106. Digital wallet 107 is provided and managed by digital wallet service provider server 106. Digital wallet service provider server 106 is run by a digital wallet service provider such as Apple®, Samsung® and Google®. Digital wallet service provider server 106 has a unique wallet service provider ID 109 while digital wallet 107 has a unique digital wallet ID 108. After digital wallet 107 has been provisioned with the payment card, digital wallet service provider server 106 sends digital wallet ID 108, wallet service provider ID 109 and payment card number 105 to platform 101 to initiate the tokenization process. Digital wallet service provider server 106 also sends wallet service provider ID 109 to platform 101.

Figure 2:
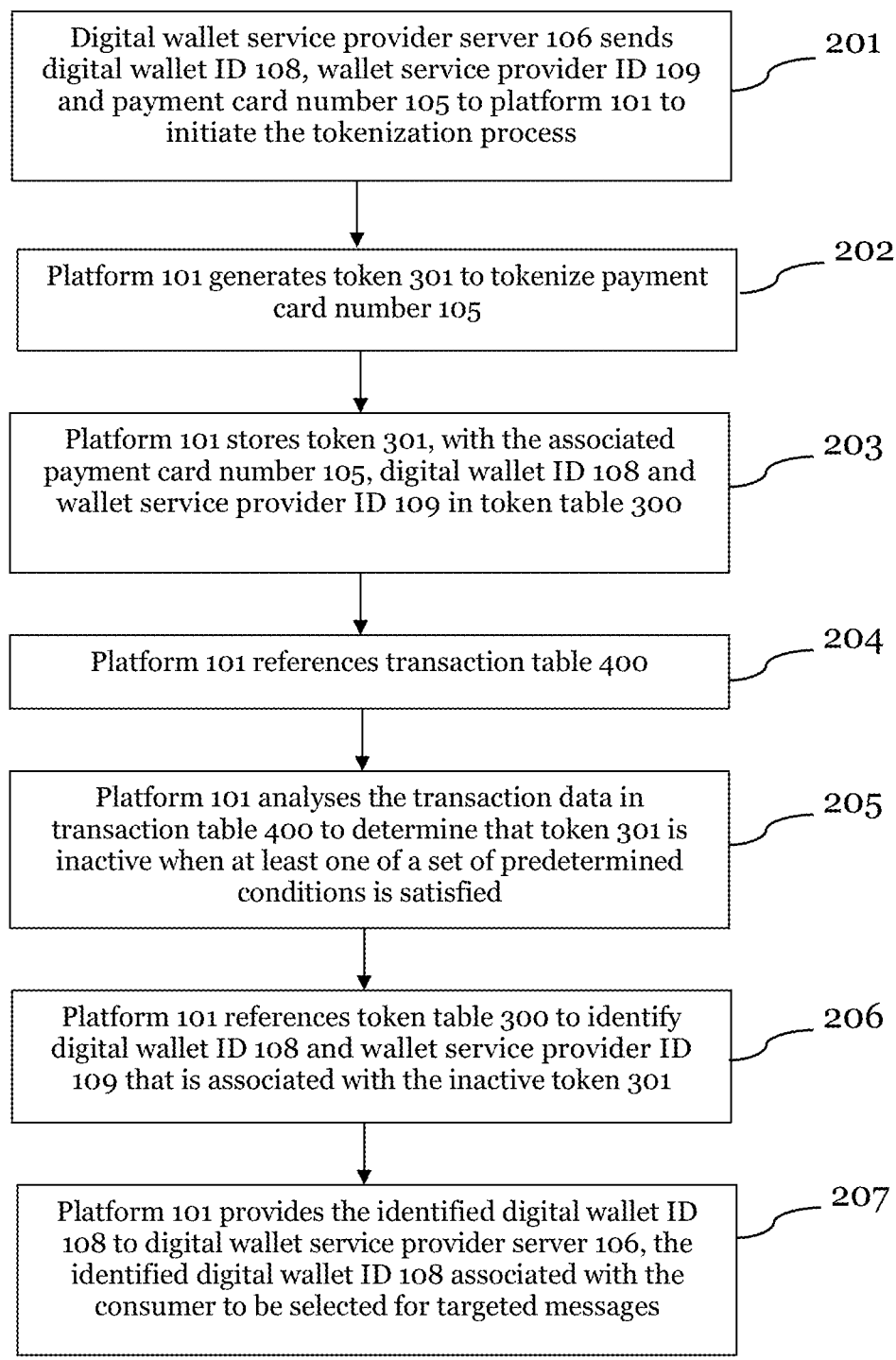
FIG. 2 shows a flowchart depicting a method for selecting consumers for targeted messages in accordance with an embodiment of the invention.

FIG. 2 shows a flowchart depicting a method for selecting consumers for targeted messages in accordance with an embodiment of the invention. In step 201, digital wallet service provider server 106 sends digital wallet ID 108, wallet service provider ID 109 and payment card number 105 to platform 101 to initiate the tokenization process.

In step 202, platform 101 generates token 301 (see FIG. 3) to tokenize payment card number 105. Tokenization is the process of substituting a sensitive data element, in this case the payment card number 105, with a non-sensitive equivalent, referred to as a token. A token by itself has no extrinsic or exploitable meaning or value. The token is a reference (i.e. identifier) that maps back to the payment card number 105 through a tokenization system.

In step 203, platform 101 stores token 301, with the associated payment card number 105, digital wallet ID 108 and wallet service provider ID 109 in token table 300. FIG. 3 provides an exemplary token table 300 having exemplary values.

In step 204, platform 101 references transaction table 400. Transaction table 400 contains transaction data, and preferably, the transaction data comprises transactions 401 for token 301. Preferably, the transaction data also comprises date transaction occurred 402 for each transaction 401. Preferably, the transaction data also comprises value 403 for each transaction 401. The transaction data in transaction table 400 is populated and updated every time a transaction occurs.

In step 205, platform 101 analyzes the transaction data in transaction table 400 to determine that token 301 is inactive when at least one of a set of predetermined conditions is satisfied. Preferably, the set of predetermined conditions includes predetermined condition one, which is the predetermined condition that the transaction data does not comprise any transactions 401 involving token 301. An illustration is provided in FIG. 4 in that there are no transactions 401 in the transaction data of transaction table 400 involving "Token 8" 301. Based on predetermined condition one, platform 101 determines that "Token 8" 301 has not been used since the tokenization process and that "Token 8" 301 is inactive.

Preferably, the set of predetermined conditions includes predetermined condition two, which is the predetermined condition that the transaction data comprises at least one transaction 401 involving token 301, and out of the at least one transaction 401 involving token 301, there is a latest transaction 401 having a date, and the time elapsed since the date of the latest transaction 401 exceeds a predetermined period. An illustration is provided in FIG. 4 in that "Transaction 1" 401 and "Transaction 2" 401 involves "Token 1" 301. "Transaction 1" 401 occurred on "1-25-2015" 402 while "Transaction 2" 401 occurred on "7-1-2015" 402. "Transaction 2" 401 is therefore the latest transaction 401. Assuming current date is Sep. 1, 2015, and assuming the predetermined period is one month, therefore more than one month has elapsed since "Transaction 2" 401. Based on predetermined condition two, platform 101 determines that "Token 1" 301 has not been used for more than a month and that "Token 1" 301 is inactive.

Preferably, the set of predetermined conditions includes predetermined condition three, which is the predetermined condition that the transaction data comprises a plurality of transactions 401 involving token 301, the plurality of transactions 401 involving token 301 comprising a first group of transactions 401 which occurred in a first period and a second group of transactions 401 which occurred in a second period, the second period being later than the first period, and the number of transactions 401 in the second group is less than the number of transactions 401 in the first group 401 by a predetermined margin. An illustration is provided in FIG. 4 in that "Transaction 3" 401, "Transaction 4" 401, "Transaction 5" 401 and "Transaction 6" 401 involve "Token 2" 301. "Transaction 3" 401 occurred on "7-30-2015" 402, "Transaction 4" 401 occurred on "7-12-2015" 402, "Transaction 5" 401 occurred on "7-30-2015" 402 while "Transaction 6" 401 occurred on "8-8-2015" 402. Assuming the first period is the month of July, therefore as "Transaction 3" 401, "Transaction 4" 401 and "Transaction 5" 401 occurred in the month of July, the transaction count for "Token 2" 301 for the month of July is three. Assuming the second period is the month of August, therefore as "Transaction 6" 401 occurred in the month of August, the transaction count for "Token 2" 301 for the month of August is one. Based on predetermined condition three, and assuming the predetermined margin is >1, platform 101 determines that the transaction count (or number of transactions) for "Token 2" 301 has dropped by more than one transaction from the month of July to the month of August and that "Token 2" 301 is inactive.

Preferably, the set of predetermined conditions includes predetermined condition four, which is the predetermined condition that the transaction data comprises a plurality of transactions 401 involving token 301, each of the plurality of transactions 401 involving token 301 having value 403, the plurality of transactions 401 involving token 301 comprising a third group of transactions 401 which occurred in a third period and a fourth group of transactions 401 which occurred in a fourth period, the fourth period being later than the third period, and the combined value 403 of the transactions 401 in the fourth group is less than the combined value 403 of the transactions 401 in the third group by a predetermined threshold. An illustration is provided in FIG. 4 in that "Transaction 7" 401, "Transaction 8" 401, and "Transaction 9" 401 involve "Token 3" 301. "Transaction 7" 401 occurred on "7-21-2015" 402, "Transaction 8" 401 occurred on "8-15-2015" 402, while "Transaction 9" 401 occurred on "8-27-2015" 402. "Transaction 7" 401 has value $200 403, "Transaction 8" 401 has value $30 403, while "Transaction 9" 401 has value $50 403. Assuming the third period is the month of July, therefore as "Transaction 7" 401 occurred in the month of July, the combined value 403 for "Token 3" 301 for the month of July is $200. Assuming the fourth period is the month of August, therefore as "Transaction 8" 401 and "Transaction 9" 401 occurred in the month of August, the combined value 403 for "Token 3" 301 for the month of August is $80. Based on predetermined condition four, and assuming the predetermined threshold is >$100, platform 101 determines that the combined value 403 for "Token 3" 301 has dropped by more than $100 from the month of July to the month of August and that "Token 3" 301 is inactive.

In step 206, platform 101 references token table 300 to identify digital wallet ID 108 and wallet service provider ID 109 that is associated with the inactive token 301.

In step 207, platform 101 provides the identified digital wallet ID 108 to digital wallet service provider server 106, the identified digital wallet ID 108 associated with the consumer to be selected for targeted messages. Platform 101 is able to determine that identified digital wallet ID 108 is to be provided to digital wallet service provider server 106 because of wallet service provider ID 109. Digital wallet service provider server 106 then sends the targeted messages to the consumer via emails, or text messages to consumer device 104, or via any delivery means or medium known in the art. However, in some embodiments, it is contemplated that platform 101 can send the targeted messages directly to the consumer. The targeted messages can contain offers or promotions to encourage use of digital wallet 107. The targeted messages can also contain warnings to warn consumers that if the consumers do not increase the usage of digital wallet 107, digital wallet 107 will be deactivated. The targeted messages can also contain step by step instructions to guide consumers on how to use digital wallet 107.

Preferably, platform 101 assigns a consumer category to identified digital wallet ID 108 based on which one of the set of predetermined conditions was satisfied (i.e. predetermined condition one, predetermined condition two, predetermined condition three or predetermined condition four). For example, if more than one predetermined condition (for example, predetermined condition three and predetermined condition four) are satisfied, the consumer category assigned to the identified digital wallet ID 108 may be "highly inactive". Therefore, based on which ones or how many of the predetermined conditions are satisfied, platform 101 will assign an appropriate consumer category to the identified digital wallet ID 108. The identified digital wallet ID 108, the assigned consumer category and a description of the consumer category will be sent to digital wallet service providers. Below are examples of the consumer categories and their corresponding descriptions:

"Consumer Category One" which describes consumers who did not transact till date, will be assigned to identified digital wallet ID 108 which satisfied predetermined condition one;

"Consumer Category Two" which describes consumers who did not transact for the last 30 days, will be assigned to identified digital wallet ID 108 which satisfied predetermined condition two;

"Consumer Category Three" which describes consumers who did not transact for the last 60 days, will be assigned to identified digital wallet ID 108 which satisfied predetermined condition two;

"Consumer Category Four" which describes consumers whose transaction count has decreased by 90%, will be assigned to identified digital wallet ID 108 which satisfied predetermined condition three;

"Consumer Category Five" which describes consumers whose transaction value has decreased by 90%, will be assigned to identified digital wallet ID 108 which satisfied predetermined condition four;

"Consumer Category Six" which describes consumers whose transaction value and transaction count has decreased by 90%, will be assigned to identified digital wallet ID 108 which satisfied predetermined condition three and predetermined condition four.

Providing the identified digital wallet IDs 108 along with the assigned consumer categories and corresponding descriptions is useful as it provides some measure to the digital wallet service providers on how inactive the consumer actually is.

Figure 5:
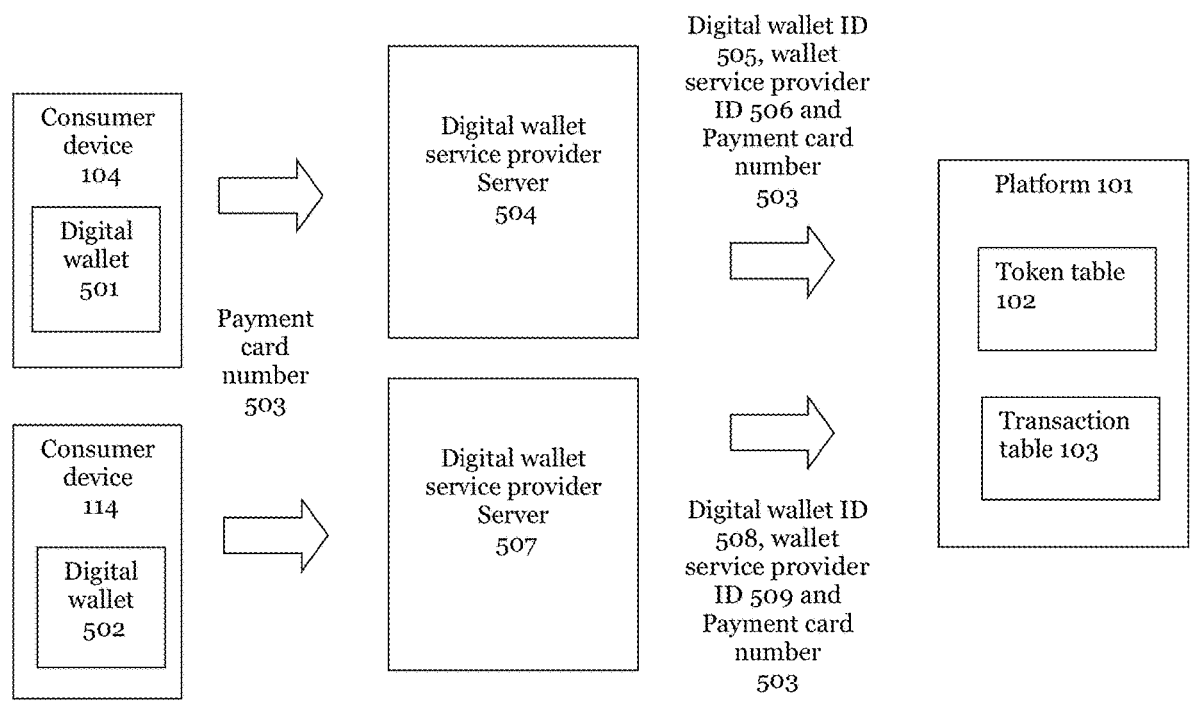
FIG. 5 shows a system for identifying consumers who are more active in using one digital wallet over another.
Figure 6:
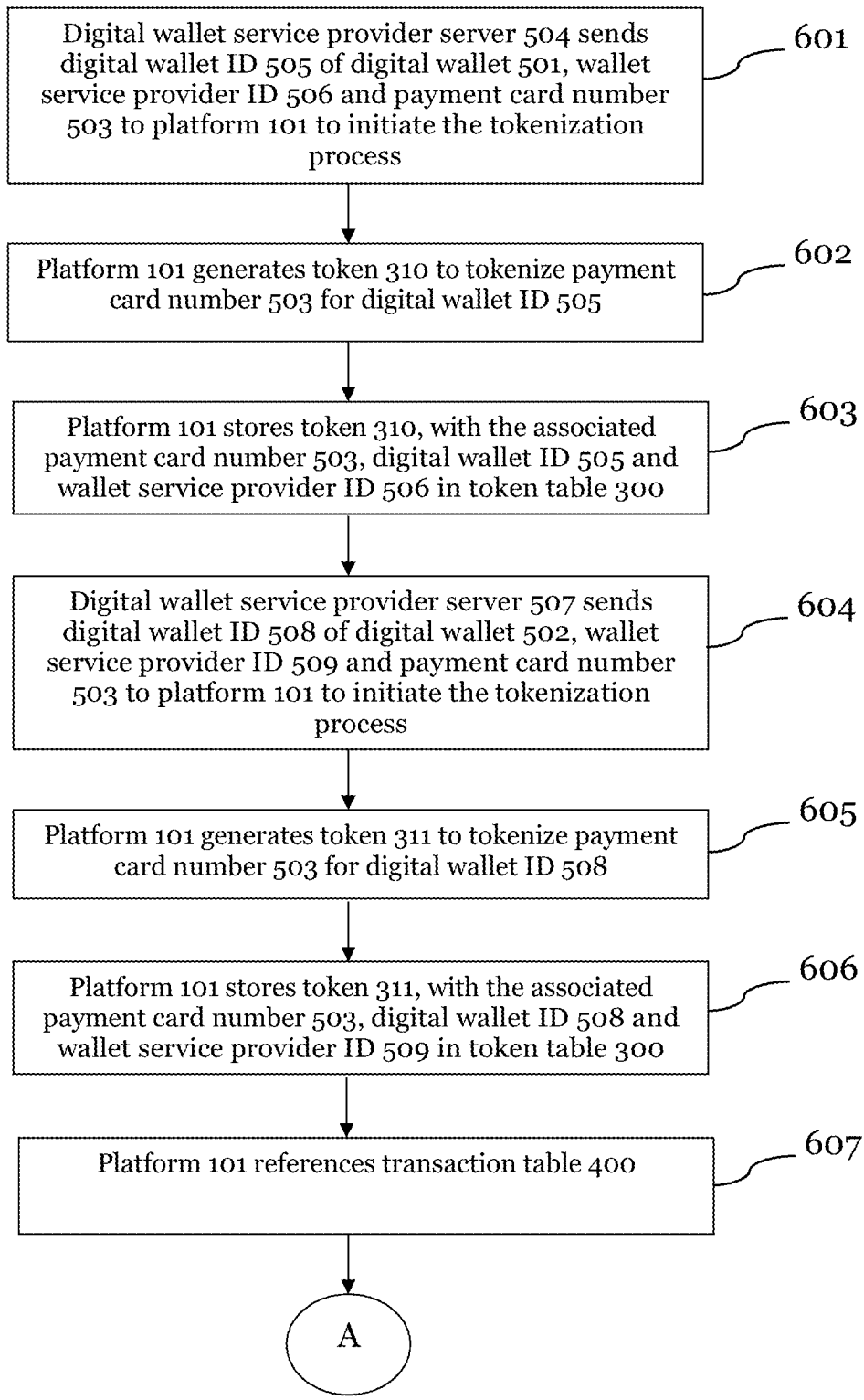
FIG. 6 shows a flowchart depicting a method for identifying consumers who are more active using one digital wallet over another.
Figure 6:
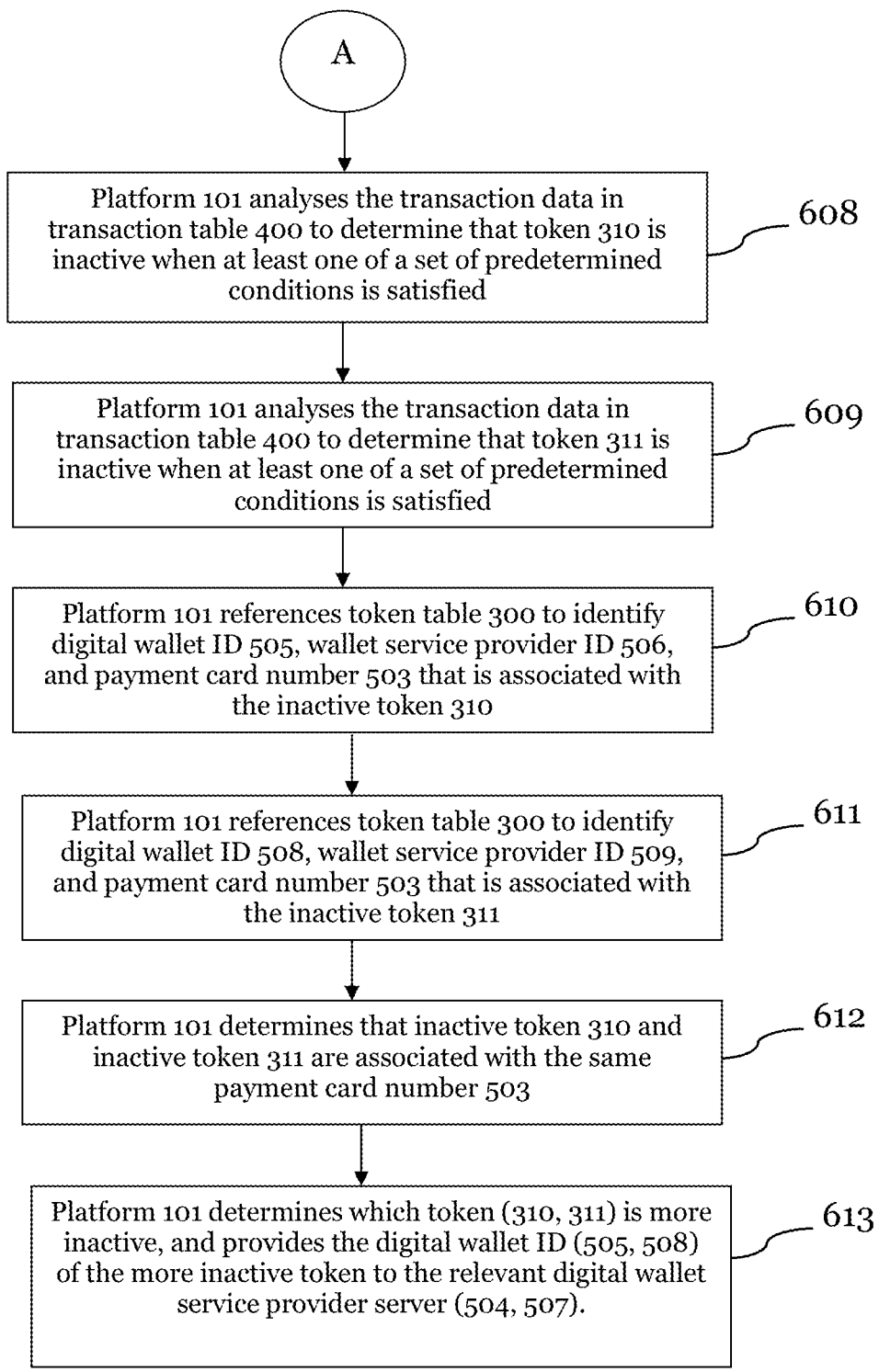

In an embodiment, platform 101 is capable of identifying consumers who are more active in using one digital wallet over another. FIG. 5 shows a system where a consumer provisions the same payment card on a first digital wallet (for example Apple Pay®) managed by one digital wallet service provider (for example Apple®), and on a second digital wallet (for example Google Wallet®) managed by another digital wallet service provider (for example Google®). Digital wallet 501 represents the first digital wallet and digital wallet 502 represents the second digital wallet. Preferably, digital wallet 501 and digital wallet 502 are installed on different consumer devices. As illustrated in FIG. 5, digital wallet 501 is installed on consumer device 104 while digital wallet 502 is installed on consumer device 114. The consumer provisions payment card number 503 onto digital wallet 501 by using consumer device 104 to send payment card number 503 to digital wallet service provider server 504. The consumer provisions payment card number 503 onto digital wallet 502 by using consumer device 114 to send payment card number 503 to digital wallet service provider server 507. FIG. 6 shows a flowchart depicting a method for identifying consumers who are more active using one digital wallet over another.

Referring to FIG. 5 and FIG. 6, in step 601, digital wallet service provider server 504 sends digital wallet ID 505 of digital wallet 501, wallet service provider ID 506 and payment card number 503 to platform 101 to initiate the tokenization process.

In step 602, platform 101 generates token 310 to tokenize payment card number 503 for digital wallet ID 505.

In step 603, platform 101 stores token 310, with the associated payment card number 503, digital wallet ID 505 and wallet service provider ID 506 in token table 300.

In step 604, digital wallet service provider server 507 sends digital wallet ID 508 of digital wallet 502, wallet service provider ID 509 and payment card number 503 to platform 101 to initiate the tokenization process.

In step 605, platform 101 generates token 311 to tokenize payment card number 503 for digital wallet ID 508.

In step 606, platform 101 stores token 311, with the associated payment card number 503, digital wallet ID 508 and wallet service provider ID 509 in token table 300.

In step 607, platform 101 references transaction table 400. Transaction table 400 contains transaction data, and preferably, the transaction data comprises transactions 401 for token 310 and token 311.

In step 608, platform 101 analyzes the transaction data in transaction table 400 to determine that token 310 is inactive when at least one of a set of predetermined conditions is satisfied. The set of predetermined conditions can be the same set of predetermined conditions described above. For example, the predetermined condition can be predetermined condition two, which is the predetermined condition that the transaction data comprises at least one transaction 401 involving token 310, and out of the at least one transaction 401 involving token 310, there is a latest transaction 401 having a date, and the time elapsed since the date of the latest transaction 401 exceeds a predetermined period. An illustration is provided in FIG. 4 in that "Transaction 15" 401 involves token 310. "Transaction 15" 401 occurred on "1-20-2015" 402. Assuming current date is Sep. 1, 2015, and assuming the predetermined period is one month, therefore more than one month has elapsed since "Transaction 15" 401. Based on predetermined condition two, platform 101 determines that token 310 has not been used for more than a month and that token 310 is inactive.

In step 609, platform 101 analyzes the transaction data in transaction table 400 to determine that token 311 is inactive when at least one of a set of predetermined conditions is satisfied. The set of predetermined conditions can be the same set of predetermined conditions described above. For example, the predetermined condition can be predetermined condition two, which is the predetermined condition that the transaction data comprises at least one transaction 401 involving token 311, and out of the at least one transaction 401 involving token 311, there is a latest transaction 401 having a date, and the time elapsed since the date of the latest transaction 401 exceeds a predetermined period. An illustration is provided in FIG. 4 in that "Transaction 16" 401 involves token 311. "Transaction 16" 401 occurred on "7-1-2015" 402. Assuming current date is Sep. 1, 2015, and assuming the predetermined period is one month, therefore more than one month has elapsed since "Transaction 16" 401. Based on predetermined condition two, platform 101 determines that token 311 has not been used for more than a month and that token 311 is inactive.

In step 610, platform 101 references token table 300 to identify digital wallet ID 505, wallet service provider ID 506, and payment card number 503 that is associated with the inactive token 310.

In step 611, platform 101 references token table 300 to identify digital wallet ID 508, wallet service provider ID 509, and payment card number 503 that is associated with the inactive token 311.

In step 612, platform 101 determines that inactive token 310 and inactive token 311 are associated with the same payment card number 503.

In step 613, platform 101 determines which token (310, 311) is more inactive, and provides the digital wallet ID (505, 508) of the more inactive token to the relevant digital wallet service provider server (504, 507). For example, if platform 101 determines that token 310 is more inactive than token 311 (due to the fact that the last transaction for token 310 occurred on "1-20-2015" 402 when compared to the last transaction for token 311 which occurred on "1-07-2015" 402), platform 101 will identify from token table 300 that token 310 is associated with digital wallet ID 505 and wallet service provider ID 506, and platform 101 will then send digital wallet ID 505 to digital wallet service provider server 504. Preferably, platform 101 assigns a consumer category to digital wallet ID 505. For example, the consumer category can be "Consumer Category Seven". The consumer category can have a corresponding description which describes consumers who are not as active using this digital wallet, but is more active using another digital wallet. Digital wallet ID 505, the assigned consumer category along with the corresponding description can be sent to digital wallet service provider server 504. This information is useful to the digital wallet service provider as this can serve as an indication that the consumer has "switched" digital wallets (i.e. from digital wallet 501 to digital wallet 502) and is more actively making purchases with digital wallet 502. The digital wallet service provider can therefore take remedial steps to convince the consumer to start actively using digital wallet 501 again by providing more incentives through targeted messages containing offers and promotions.

Figure 7:
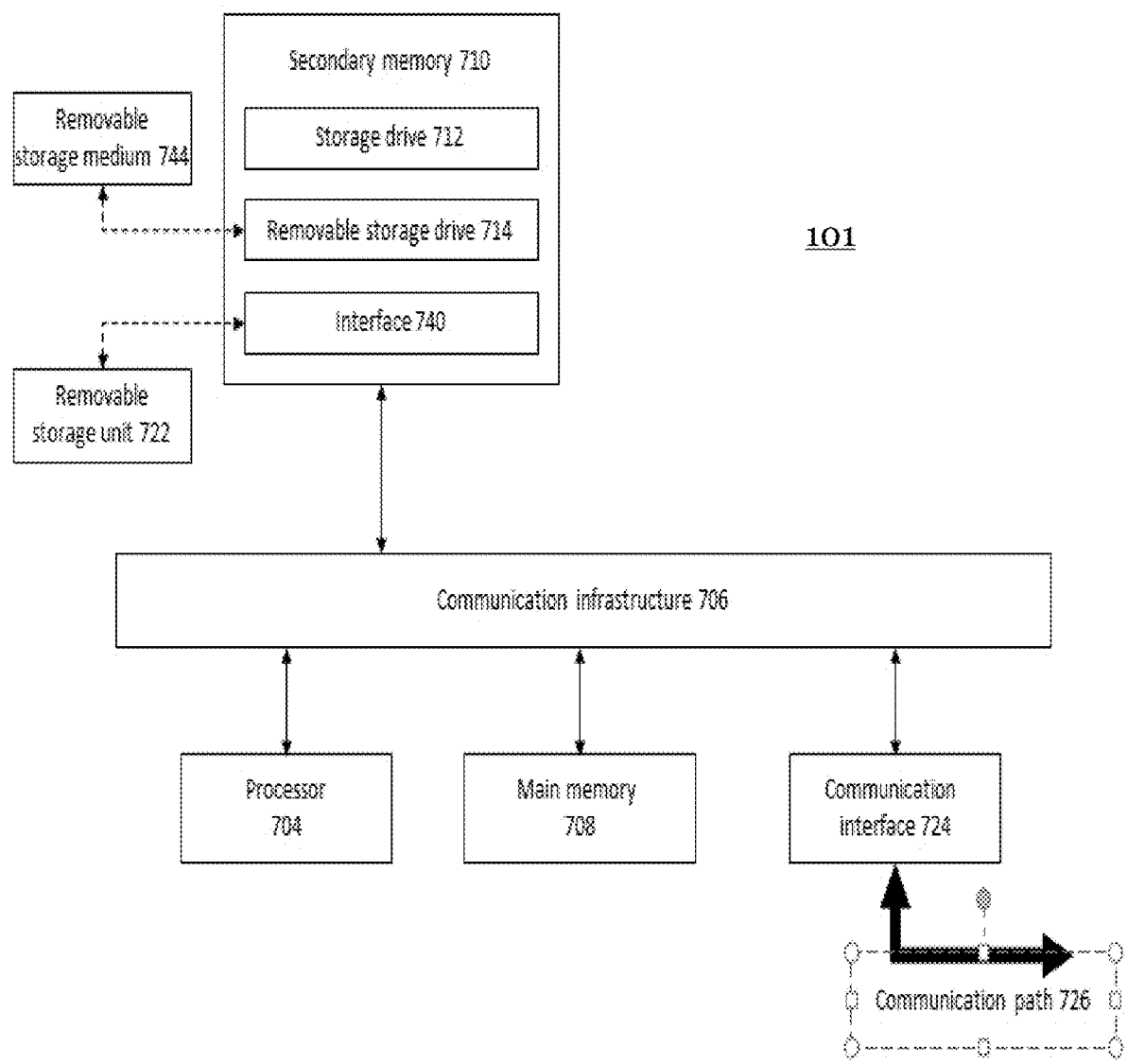
FIG. 7 shows an exemplary platform for performing the functions in accordance with an embodiment of the invention.

The following description of platform 101 is provided by way of example only and is not intended to be limiting. Platform 101 may comprise of a server or a plurality of servers. As shown in FIG. 7, the exemplary platform 101 includes a processor 704 for executing software routines. Although a single processor is shown for the sake of clarity, platform 101 may also include a multi-processor system. The processor 704 is connected to a communication infrastructure 706 for communication with other components of platform 101. The communication infrastructure 706 may include, for example, a communications bus, cross-bar, or network. Platform 101 further includes a main memory 708, such as a random access memory (RAM), and a secondary memory 710.

The secondary memory 710 may include, for example, a storage drive 712, which may be a hard disk drive, a solid state drive or a hybrid drive and/or a removable storage drive 714, which may include a magnetic tape drive, an optical disk drive, a solid state storage drive (such as a USB flash drive, a flash memory device, a solid state drive or a memory card), or the like. The removable storage drive 714 reads from and/or writes to a removable storage medium 744 in a well-known manner. The removable storage medium 744 may include magnetic tape, optical disk, non-volatile memory storage medium, or the like, which is read by and written to by removable storage drive 714. As will be appreciated by persons skilled in the relevant art(s), the removable storage medium 744 includes a computer readable storage medium having stored therein computer executable program code instructions and/or data. In an alternative implementation, the secondary memory 710 may additionally or alternatively include other similar means for allowing computer programs or other instructions to be loaded into platform 101. Such means can include, for example, a removable storage unit 722. Examples of a removable storage unit 722 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 722 which allow software and data to be transferred from the removable storage unit 722 to platform 101.

Platform 101 also includes at least one communication interface 724. The communication interface 724 allows software and data to be transferred between platform 101 and external devices via a communication path 726. In various embodiments of the inventions, the communication interface 724 permits data to be transferred between platform 101 and a data communication network, such as a public data or private data communication network. Examples of a communication interface 724 can include a modem, a network interface (such as an Ethernet card), a communication port (such as a serial, parallel, printer, GPIB, IEEE 1394, RJ45, USB), an antenna with associated circuitry and the like. The communication interface 724 may be wired or may be wireless. Software and data transferred via the communication interface 724 are in the form of signals which can be electronic, electromagnetic, optical or other signals capable of being received by communication interface 724. These signals are provided to the communication interface via the communication path 726.

Software may be stored in a computer program product and loaded into platform 101 using the removable storage drive 714, the storage drive 712, or the interface 740. Alternatively, the computer program product may be downloaded to platform 101 over the communications path 726. The software, when executed by the processor 704, causes platform 101 to perform functions of embodiments described herein. It is to be understood that the embodiment of FIG. 7 is presented merely by way of example. Therefore, in some embodiments one or more features of platform 101 may be omitted. Also, in some embodiments, one or more features of platform 101 may be combined together. Additionally, in some embodiments, one or more features of platform 101 may be split into one or more component parts.

As used herein, the term "computer program product" may refer, in part, to removable storage medium 744, removable storage unit 722, a hard disk installed in storage drive 712, or a carrier wave carrying software over communication path 726 (wireless link or cable) to communication interface 724. Computer readable storage media refers to any non-transitory, non-volatile tangible storage medium that provides recorded instructions and/or data to platform 101 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of platform 101. Examples of transitory or non-tangible computer readable transmission media that may also participate in the provision of software, application programs, instructions and/or data to platform 101 include radio or infra-red transmission channels as well as a network connection to another computer or networked device, and the Internet or Intranets including e-mail transmissions and information recorded on Websites and the like.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A method of monitoring transaction activity of payment cards associated with digital wallets, the method comprising:
   providing a platform separately from the digital wallets, the platform including at least one server, with at least one processor, and a database stored on the at least one server;
   in response to a payment card being added to a digital wallet maintained by a digital wallet service provider, sending, by the digital wallet service provider, to the platform, a payment card number of the payment card, a digital wallet ID associated with the digital wallet, and, a wallet service provider ID associated with the digital wallet service provider;
   receiving, at the platform, the payment card number, the digital wallet ID, and the wallet service provider ID;
   generating, by the platform, a token associated with the payment card number;
   storing in a token table, located in the database, an association of the wallet service provider ID, the digital wallet ID, and the token;
   storing transaction data in a transaction table, located in the database, associations between the token and dates and values of transactions included in the transaction data;
   identifying, at the platform, the transactions associated with the token to determine if the token is active based on at least one of a set of predetermined conditions including one or more of: occurrences of the transactions associated with the token, frequency of the transactions associated with the token and values of the transactions associated with the token, wherein if the token is determined to not be active, the token is identified as inactive;
   if the token is determined to be inactive, identifying at the platform, the digital wallet ID and the wallet service provider ID that are associated with the inactive token in the token table;
   providing from the platform to the digital wallet service provider associated with the wallet service provider ID, the identified digital wallet ID;
   alerting a consumer associated with the identified digital wallet ID of insufficient activity related to the identified digital wallet ID.

2. The method of claim 1 wherein the set of predetermined conditions includes determining if the token is active by comparing a quantity of the occurrences of the transactions associated with the token with a predetermined value.

3. The method of claim 1 wherein the set of predetermined conditions includes determining if the token is active by comparing the date of a first of the transactions associated with the token, with the date of a second of the transactions associated with the token to determine if the time elapsed between the first and second transactions is within a predetermined period.

4. The method of claim 1 wherein the set of predetermined conditions includes determining if the token is active by comparing a first quantity, occurring during a first time period, of the transactions associated with the token, with a second quantity, occurring during a second time period, of the transactions associated with the token, the second time period being later than the first time period, to determine if the second quantity is within a predetermined margin of the first quantity.

5. The method of claim 1 wherein the set of predetermined conditions includes determining if the token is active by comparing a first set, occurring during a first time period, of the transactions associated with the token, with a second set, occurring during a second time period, of the transactions associated with the token, the second time period being later than the first time period, to determine if the combined value of the second set of the transactions associated with the token is within a predetermined margin of the combined value of the first set of the transactions associated with the token.

6. A system for monitoring transaction activity of payment cards associated with digital wallets, the system comprising:
   a platform separate from the digital wallets, the platform including at least one server, with at least one processor, and a database stored on the at least one server, the at least one processor including non-transitory instructions associated therewith configured to cause the platform to:
   in response to a payment card being added to a digital wallet maintained by a digital wallet service provider, receive, from the digital wallet service provider, a payment card number of the payment card, a digital wallet ID associated with the digital wallet, and, a wallet service provider ID associated with the digital wallet service provider;
   generate a token associated with the payment card number;
   store in a token table, located in the database, an association of the wallet service provider ID, the digital wallet ID, and the token;
   store transaction data in a transaction table, located in the database, associations between the token and dates and values of transactions included in the transaction data;
   identify the transactions associated with the token to determine if the token is active based on at least one of a set of predetermined conditions including one or more of: occurrences of the transactions associated with the token, frequency of the transactions associated with the token and values of the transactions associated with the token, wherein if the token is determined to not be active, the token is identified as inactive;
   if the token is determined to be inactive, identify the digital wallet ID and the wallet service provider ID that are associated with the inactive token in the token table;
   provide to the digital wallet service provider associated with the wallet service provider ID, the identified digital wallet ID;
   alert a consumer associated with the identified digital wallet ID of insufficient activity related to the identified digital wallet ID.

7. The system of claim 6 wherein the set of predetermined conditions includes determining if the token is active by comparing a quantity of the occurrences of the transactions associated with the token with a predetermined value.

8. The system of claim 6 wherein the set of predetermined conditions includes determining if the token is active by comparing the date of a first of the transactions associated with the token, with the date of a second of the transactions associated with the token to determine if the time elapsed between the first and second transactions is within a predetermined period.

9. The system of claim 6 wherein the set of predetermined conditions includes determining if the token is active by comparing a first quantity, occurring during a first time period, of the transactions associated with the token, with a second quantity, occurring during a second time period, of the transactions associated with the token, the second time period being later than the first time period, to determine if the second quantity is within a predetermined margin of the first quantity.

10. The system of claim 6 wherein the set of predetermined conditions includes determining if the token is active by comparing a first set, occurring during a first time period, of the transactions associated with the token, with a second set, occurring during a second time period, of the transactions associated with the token, the second time period being later than the first time period, to determine if the combined value of the second set of the transactions associated with the token is within a predetermined margin of the combined value of the first set of the transactions associated with the token.

\* \* \* \* \*